United States Patent [19]
Schiemann Wolfram

[11] 3,744,656
[45] July 10, 1973

[54] CONTAINER

[76] Inventor: Wolfram Schiemann, Eugen-Nagele Strasse 17, 714 Ludwigsburg, Germany

[22] Filed: Nov. 12, 1971

[21] Appl. No.: 198,192

[30] Foreign Application Priority Data
Nov. 16, 1970 Germany............. P 20 56 247.4

[52] U.S. Cl............. 215/31, 215/1 C, 215/100 A
[51] Int. Cl..................... B65d 11/26, B65d 25/28
[58] Field of Search.............. 215/1 C, 31, 100 R, 215/100 A; 220/94 R, 85 SP; 264/250, 274; 222/466, 92

[56] References Cited
UNITED STATES PATENTS
| | | | |
|---|---|---|---|
| 3,437,231 | 4/1969 | Carpenter | 215/43 R X |
| 3,124,273 | 3/1964 | Remington | 215/31 UX |
| 2,184,712 | 8/1936 | Fleissig | 215/43 R UX |

Primary Examiner—Donald F. Norton
Attorney—N. Robert Kestenbaum

[57] ABSTRACT

A hollow blow-moulded container has injection moulded inserts for handles and a reinforcing outlet ring. The inner face of the inserts are provided with a plurality of raised portions, such as small cones or parallel fluting, which pierce but do not fully penetrate the adjacent container wall.

7 Claims, 7 Drawing Figures

CONTAINER

The invention relates to a blow-moulded container which has injection-moulded inserts which are made of an at least similar plastics material to the blow-moulded material and the inner faces of which bear against a wall made of blow-moulded plastics material.

On account of rigidity, material properties or undercutting blow moulding itself often cannot provide containers with those parts which the end products should have. In the case of three-handle containers it is impossible e.g. to manufacture both outer handles by blow-moulding and compression, as can be done with the central handle. In this case therefore the outer handles are separately manufactured by injection moulding, and provided with a plate which follows the outer contour of the container, and the handles and handle plates which are pre-heated to approximately 120°C are inserted into the die sections. If the tube is then blown in the mould, the hot tube of extrudate lies on the inner face of the handle plate. The weld between the handle plate and the blow-moulded plastics material must be good since the forces acting on this point of connection can be very great. For example, it must be possible for a 20 or 30 litre container to be suspended by its three handles from a descending parachute even at temperatures ranging from −20° to +40°C. Several factors preclude a satisfactory weld:

1. The outer side of the blow-moulded plastics material has a thin layer similar to paraffin which acts as a barrier layer with regard to welding.
2. The tube moving out of the extruder cools down when falling during manufacture, particularly in the outer wall sections which later come to rest on the inner face of the handle plates. Therefore the heat in the outer wall sections is inadequate for welding.
3. Air cushions which give rise to unsatisfactory welding results may form between the inner faces of the handle plate and the blow-moulded plastics material.

The same applies to other inserts, such as e.g. reinforcing rings inside the outlet. These reinforcing rings are made of one material and used because they have very accurate dimensions and provide the outlets with such rigidity that its thread or the like is not pressed inwards, and because its outer face can be definitely kept flat so that sealing problems are reduced.

The problem underlying the invention is to provide a solution whereby the above-mentioned disadvantages can be totally avoided and whereby it is possible to obtain a weld which meets all requirements.

This problem is solved in accordance with the invention in that the inner face of the insert is provided with a plurality of raised portions which do not penetrate the adjacent wall of the blow-moulded plastics material fully but pierce and break up the surface of the blow-moulded plastics material at this point. As used herein, it should be understood that the "inner face" of the insert refers to the face of the insert which bears against the wall surface of the blow-moulded plastics material.

Other advantages and features of the invention are shown in the following description of preferred embodiments. In the drawings.

Figure 1:
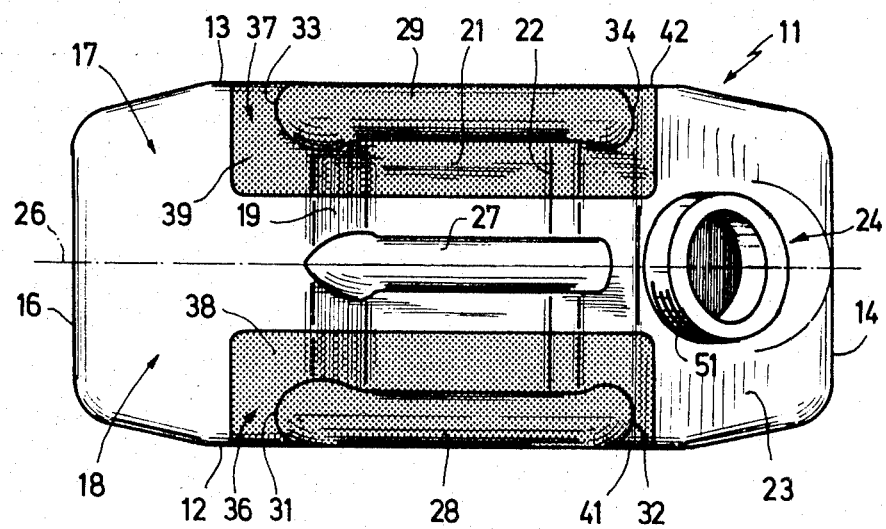
FIG. 1 shows a plan view of a standing container according to the invention.

A container 11 in the form of the known 20 litre jerry can comprises side walls 12, 13, and a front wall 14, a rear wall 16 and an upper wall 17. The upper wall 17 has a horizontal section 18 which leads to an almost vertical inclined face 19 in a second approximately horizontal section 21. When viewed from the side, this horizontal section 21 is connected to a round face 22 and then leads into a steeply inclined face 23 from which the outlet 24 extends diagonally upwards.

Figure 2:
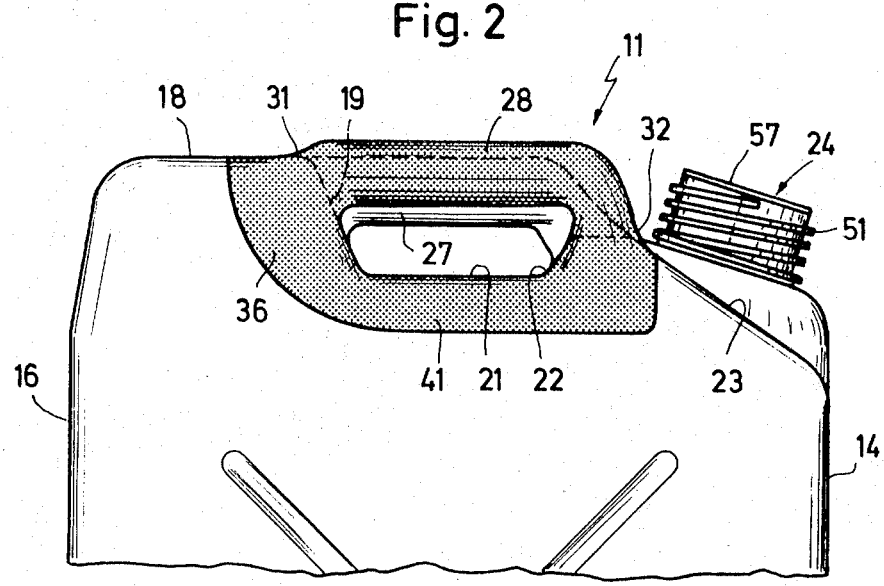
FIG. 2 shows a side view of the upper area of a standing container.
Figure 3:
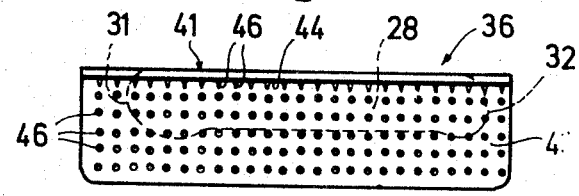
FIG. 3 shows a view below a handle plate.
Figure 4:
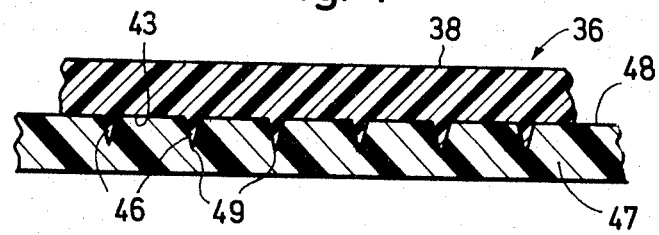
FIG. 4 shows a cross-section through the handle plate in the vicinity of a small cone with a wall section supported thereon.
Figure 5:
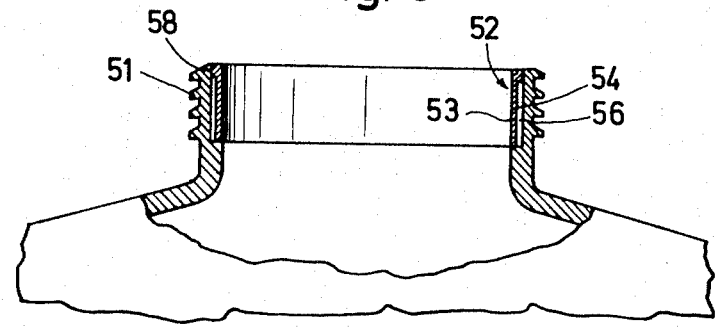
FIG. 5 shows an axial section through the outlet.
Figure 6:
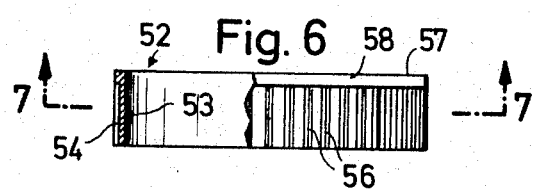
FIG. 6 shows a partially cut-away side view of an inner ring.
Figure 7:
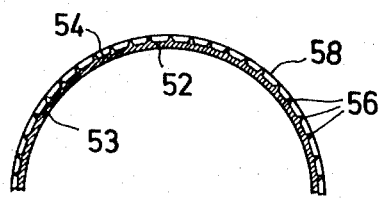
FIG. 7 shows a radial section through part of the inner ring along the line 7—7.

A central handle 27 which begins in the section 21 and ends after the rounded face 22 is provided symmetrically to the dividing plane 26 of the die sections (not shown). From the beginning the handle 27 is integral with the container 11. Two outer handles 28,29 which are shown in FIG. 1 with their outer edges in alignment with the side walls 12,13 extend parallel to the central handle 27. The roots 31,32,33 34 of the handles are staggered inwards so that the outer handles 28,29 are inclined slightly outwards. The handle ends 31,32,33,34 lead into handle plates 36,37. The latter have the same thickness as the upper wall 17 and the side walls 12, 13. The outer faces of the handle plates 36,37 follow the shape of the container 11 and extend a short distance into the upper wall 17 and the side wall 12,13 as shown in FIGS. 1 and 2. The outer faces 38,39 having the required radii and lying essentially in horizontal planes therefore lead into outer faces 41,42 which are substantially vertical. The outer faces 38,42 correspond to inner faces 43,44. On these inner faces there are a large number of small pointed cones 46 of circular cross-section so that the view shown in FIG. 3 produces a view similar to a rough file. The outer handles 28,29 and their handle plates 36,37 are made of the same material as the container 11 and inserted into the two die sections so that the inner faces 43,44 form part of the boundary wall of the die sections. If the hollow body from which the container 11 is to be made is then blow-moulded in a hot condition, the outer face 48 of the wall 47 (FIG. 4) moves nearer to the inner faces 43,44 of the handle plates 36,37. In this case the air can escape freely. If the outer face 48 of the wall 47 then passes over the small cones 46, it is slightly penetrated by the tips 49 without being fully pierced. The tips 49 push forward into the sufficiently hot sections of the wall 47 and break up the paraffin-like film on the outer face 48 and at least the area around the tip 49 melts completely with the wall 47 to form a homogeneous mass. It is then impossible to imagine that at the worst joint welding takes place only in the vicinity of the tips 49. Even in the worst case a joint occurs naturally on all surfaces of contact, the joint being of optimum quality in the vicinity of the tips 49. In addition the tips 49 increase the area of the outer face 48 bearing against the inner faces 43,44.

The outlet 24 carries a male thread 51 on which a cap can be screwed. An inner ring 52 is located at this point for the purpose of strain hardenening, calibrating the inner face and providing a defined sealing surface. The cylindrical outer face 53 of the inner ring 52 is flat.

However, the inner face 54 comprises axially parallel fluting 56 having an approximately triangular cross-section and a height of 1 mm when the ring has a thickness of approximately 2mm. The spacing at the bottom of the fluting is also approximately 1mm. The dimensions can be varied in relation to one another. The raised sections cannot be made too small because otherwise they will not penetrate far enough into the wall even if they are sufficiently pointed. Leading towards the pouring end the fluting 56 ends in front of the outer face 57, which at the same time forms a defined sealing face for the screw cap, and leads into a narrow outer rim 58 approximately 3mm in height.

It is possible to imagine that the wall is accurately divided at this point, and the fluting 56 passes into sufficiently hot sections to be welded into a homogenous form at this point. The preferred material used for both the container 11 and the inserts is a low-pressure polyethylene 57/40 manufactured by Firma Hoechst.

It has been found that axially parallel fluting 56 allows the air to escape between the wall and insert whereas fluting extending perpendicular thereto would enclose the air between the individual grooves.

Naturally the surfaces in question can also be roughened, but this produces a different effect to the raised portions which divide up the outer wall sections of the blow-moulded plastics materials.

The small cones and fluting can also have a different shape, but only if it is ensured that the projections penetrate the walls. In particular the small cones do not have to be as pointed as in the drawings, and they can be far more numerous than shown in the drawings. The small cones are formed from the negative impressions from the blows of a center punch upon the tool for injection moulding the handle plate.

What is claimed is:

1. A blow moulded plastic container comprising an injection-moulded inset which is made of at least a similar plastic material to the blow-moulded material, a face of which bears against a wall section of blow-moulded plastic material and comprises a plurality of raised portions which do not fully penetrate the adjacent wall section of blow-moulded plastic material, but pierce and break through the surface of blow-moulded material at this point.

2. A container as claimed in claim 1, in which the insert is a handle plate made of injection-moulded thermoplastic material, a face of said handle plate bearing against a corresponding wall section of the blow-moulded plastic material and including the raised portions.

3. A container as claimed in claim 2, in which the raised portions are small cones.

4. A container as claimed in claim 3, in which the raised portions are formed from negative impressions of punches in the tool for injection-moulding the handle plate.

5. A container as claimed in claim 1, in which the insert is an inner ring made of injection-moulded thermoplastic material for reinforcing an outlet in the container and a face of the inner ring is provided with axially parallel fluting.

6. A container as claimed in claim 5, in which the fluting is approximately triangular in cross-section.

7. A container as claimed in claim 5, in which the fluting extends only as far as a narrow substantially smooth rim which is arranged at the pouring end of the container and is approximately the same height as the fluting.

* * * * *